US006470377B1

(12) United States Patent
Sevcik et al.

(10) Patent No.: US 6,470,377 B1
(45) Date of Patent: Oct. 22, 2002

(54) NETWORKED FILE OPERATIONS FOR COMPUTER NUMERICAL CONTROLS

(75) Inventors: George J. Sevcik, Brecksville; Michael Piatka, Mentor; Subbian Govindaraj, South Euclid, all of OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 23 days.

(21) Appl. No.: 08/994,517

(22) Filed: Dec. 19, 1997

(51) Int. Cl.[7] ............................................. G06F 15/16
(52) U.S. Cl. ..................... 709/201; 717/10; 700/181
(58) Field of Search ..................... 340/825.08; 395/500, 395/187.01, 326, 616; 345/352; 364/471.03, 474.16, 474.01, 468.03; 700/181, 190.1; 717/10–15; 709/200–203

(56) References Cited

U.S. PATENT DOCUMENTS

| | | | |
|---|---|---|---|
| 4,418,381 A | | 11/1983 | Molusis et al. ............. 364/131 |
| 4,446,525 A | * | 5/1984 | Hoch et al. .................. 364/474 |
| 4,484,286 A | * | 11/1984 | Nagamine et al. .......... 700/181 |
| 4,723,219 A | * | 2/1988 | Beyer et al. ................. 700/190 |
| 4,774,674 A | * | 9/1988 | Otake ............................. 700/1 |
| 5,291,416 A | * | 3/1994 | Hutchins ................ 364/474.16 |
| 5,485,620 A | * | 1/1996 | Sadre et al. ................... 717/10 |
| 5,544,046 A | * | 8/1996 | Niwa .................... 364/474.01 |
| 5,617,528 A | * | 4/1997 | Stechmann et al. ......... 395/326 |
| 5,652,866 A | * | 7/1997 | Alfred et al. ................ 395/500 |
| 5,691,897 A | | 11/1997 | Brown et al. .......... 364/167.01 |
| 5,737,523 A | * | 4/1998 | Callaghan et al. ...... 395/187.01 |
| 5,764,155 A | * | 6/1998 | Kertesz et al. ......... 340/825.08 |
| 5,822,207 A | | 10/1998 | Hazama et al. ......... 364/468.03 |
| 5,828,575 A | | 10/1998 | Sakai ..................... 364/474.24 |
| 5,852,441 A | * | 12/1998 | Nakajima et al. ............ 345/352 |
| 6,101,425 A | * | 8/2000 | Govindaraj et al. ......... 700/181 |
| 6,144,895 A | * | 11/2000 | Govindaraj et al. ......... 700/181 |

OTHER PUBLICATIONS

Stanislowski. Instrument control Enhancements Using Microsoft Windows 3.0 IEEE Jun. 1992.*
Carstoiu et al. Netware Dynamic Data Exchange IEEE Jun. 1994.*
Barcellos et al. A Novel Waveform Analyzer for Analog and Digital Signals for the Windows environment Apr. 1997.*

* cited by examiner

*Primary Examiner*—Mark H. Rinehart
*Assistant Examiner*—Thong Vu
(74) *Attorney, Agent, or Firm*—Robert A. Van Someren; Alexander M. Gerasimow; William R. Walbrun (57) ABSTRACT

A networked system combines multiple workstations, storage devices and file handlers with multiple computer numerical controls. Typically, each workstation comprises a personal computer with a Windows-based operating system utilizing a standard process-to-process communication protocol, such as Dynamic Data Exchange (DDE). This type of system allows a wide variety of M-to-N topologies in CNC environments. Further, the use of a file management system, according to the present invention, allows the activation and execution of part program operations at a computer numerical control on files accessed through standard open networks.

23 Claims, 7 Drawing Sheets

NETWORKED FILE OPERATIONS FOR COMPUTER NUMERICAL CONTROLS

FIELD OF THE INVENTION

The present invention relates generally to a system of networked workstations and computer numerical controls (CNCs), and particularly to a system that facilitates the activation and execution of part programs and part program functions on files stored and accessed through standard open networks.

BACKGROUND OF THE INVENTION

A variety of controls are used to monitor and control various types of machine motion. For example, processor based controls, such as computer numerical controls or CNCs, are used to control the motion of machines, such as machine tools or transfer line equipment, that are used in a variety of manufacturing environments. A CNC, for instance, may be used to control the movements of a cutter on a machine tool when machining a part or component for use in the manufacture of a given product.

CNC-type controllers have become very popular due, in part, to their adaptability and relative ease-of-use in controlling machine motion. When machining a part, for example, a machine motion control program, e.g., part program, simply can be loaded into the CNC which then causes the machine to move according to the commands established by the part program. The control is designed to read the part program instructions and provide appropriate outputs to the various servos, stepper motors, etc. that physically move the components of the machine. The CNC also may be used to monitor multiple items related to motion control. For example, in a closed loop type system, a variety of sensors are disposed on the machine to provide outputs to the CNC indicative of various parameters, such as position and speed, so the CNC can compare the sensed parameters with the programmed parameters to detect and correct for any error between the values. As is understood by those of ordinary skill in the art, CNC-type controllers are able to process a wide variety of data related to controlling machine motion, monitoring machine motion, storing and manipulating of part program data, etc.

Traditionally, CNCs have been configured in various ways depending on the CNC design as established by the CNC manufacturer and/or end user. For instance, CNCs typically have included a visual interface, such as a CRT, and a keyboard that allow machine control programs to be entered or edited directly at the CNC. In some systems, machine control programs can be prepared offsite at a workstation, such as a personal computer, that is configured to permit an operator to prepare motion control programs in a language/syntax that is recognizable and useable by the CNC. The program is then loaded onto a storage medium, such as a punch tape, magnetic tape or diskette, and physically taken to the CNC where it is downloaded for use by the CNC in controlling machine motion. For some applications, the program may be transferred electronically from the personal computer to the CNC for execution. In any of these situations, the motion control program must be prepared in a format recognizable and useable by the CNC. However, CNCs were unable to activate and execute part programs or perform other part program functions on files stored and accessed through standard open networks.

Simultaneously with the development of CNC-type machine controllers, computer networks and personal computers have evolved. Computer networks are now available to permit linking multiple personal computers and other devices across a single network. For example, local area networks (LANs), such as an Ethernet network, can be used to connect multiple personal computers and data servers with each other and with other devices, e.g., printers and various instruments. The common network allows data to be transferred between the various devices linked to the network.

To permit the networked personal computers and other devices to communicate, it is necessary that the devices have compatible application programming interfaces (APIs) to permit data exchange. In the personal computer area, some common API choices are "C" application programming interfaces (CAPI), dynamic data exchange (DDE™) and object linking and embedding (OLE) automation. Each of these choices has its own advantages and disadvantages depending on the PC operating systems, requirements for support on multiple operating systems, and technologies involved.

For example, DDE has become a very popular data exchange mechanism between Windows™-based applications. When using personal computers having Windows-based operating systems, such as Windows ™ and Windows 95™, DDE may be the data exchange mechanism of choice.

With respect to both stand alone personal computers and networked personal computers, the trend has been toward utilization of Windows-based applications. Consequently, a large percentage of personal computers presently have operating systems that utilize Windows-based applications. In many manufacturing and other machine control environments, it would be advantageous to network one or more CNCs with one or more PC based workstations using Windows. Heretofore, however, machine control and CNC command protocols have not been amenable for use with Windows-based applications. Although DDE, for instance, has been used routinely with Windows to accomplish process-to-process communications, this protocol has not been available for networked CNCs. (It should be noted that DDE, Windows, WindowsNT and Windows95 are trademarks of Microsoft Corporation.)

By, among other things, rendering Windows-based applications compatible with CNCs and CNC protocols, there potentially is a wide variety of network topologies that become possible. For example, an open M-to-N topology linking M CNCs with N man-machine interfaces, e.g., workstations, over a commonly used network can provide great convenience and adaptability for supporting many CNC/manufacturing environments as well as supporting other intercommunication between additional applications and devices linked to the common network. In this type of open networked system, it would be advantageous to have the capability of moving part program files and other files between workstations and CNCs. It also would be advantageous to activate and execute part program operations from a network location remote from the CNC responsible for implementing the program operation.

The present invention addresses the foregoing drawbacks and provides a file handling system for use with a networked system of workstations and computer numerical controls.

SUMMARY OF THE INVENTION

The present invention relates to a system for effecting file operations at a computer numerical control on files accessed at a remote location through a standard open network. The system comprises a network and a plurality of computer numerical controls linked to the network. Preferably, a machine is linked to each computer numerical control, and each machine includes movable components that undergo predetermined motions provided by the computer numerical control. A plurality of workstations also are linked to the network with at least one workstation including a file handler. Further, a memory device also is linked to the network and is configured to store a file having a machine control program related to control of one or more of the plurality of machines. The file handler is configured to selectively transfer the machine control program to the computer numerical control or to run the machine control program from its location on the networked memory device.

According to another aspect of the present invention, a file management system is provided for use with a plurality of networked workstations and computer numerical controls. The system includes a file handler configured for communication with the plurality of networked workstations and computer numerical controls. The file handler includes a file server and a file client. The system also includes a storage medium able to store a part program for use by one or more designated computer numerical controls in controlling machine motion. The file server is designed to selectively manage transfer of the part program to a designated, networked computer numerical control from the storage medium or to manage execution of the part program from its location on the storage medium. The file client, on the other hand, is designed to manage transfer of data from the computer numerical control to the storage medium.

According to yet another aspect of the present invention, a system is provided for utilizing multiple types of file operations on a networked computer numerical control from a remote, networked storage medium. The system comprises at least one workstation and at least one computer numerical control linked to an open network capable of carrying communications between multiple types of devices. The system also includes a storage medium that is located remotely from the computer numerical control. The storage medium is able to store a file having a motion control program for use by the at least one computer numerical control. A file handler is linked to the open network to handle instructions from the at least one workstation regarding execution of the file or movement of the file between the at least one computer numerical control and the storage medium.

BRIEF DESCRIPTION OF THE INVENTION

The invention will hereafter be described with reference to the accompanying drawings, wherein like reference numerals denote like elements, and.

DETAILED DESCRIPTION OF THE PREFERRED EMBODIMENTS

The present invention provides a system for utilizing networked workstations, file handlers and storage mediums with computer numerical controls (CNCs) in a wide variety of manufacturing and production environments. Specifically, the present invention facilitates a CNC's ability to activate and execute part programs or other part program functions on files stored and accessed through standard, open networks. The file management system of the present invention allows the performance of file transfers and part program operations across an M-to-N network of CNCs and host computers.

Figure 1:
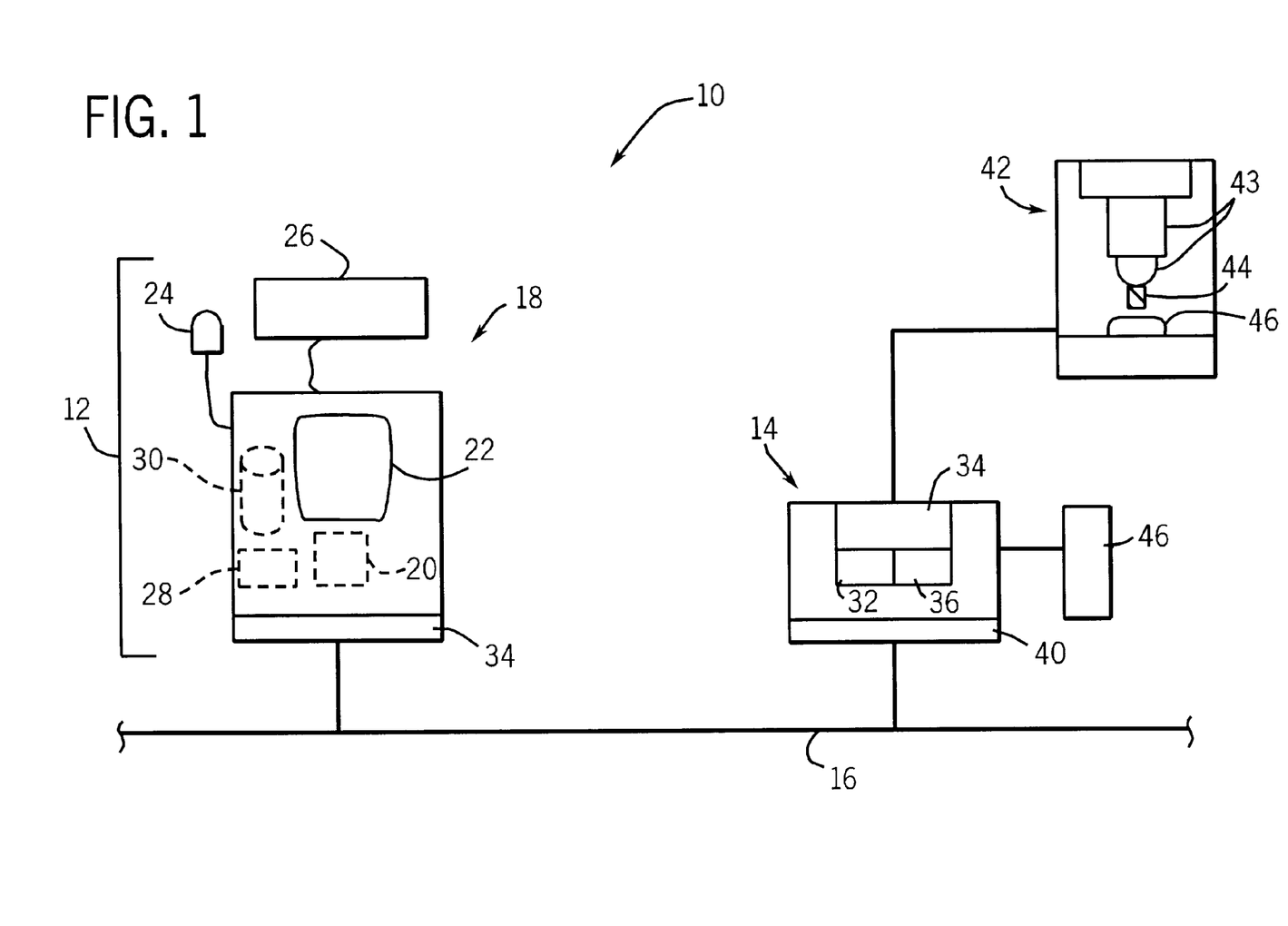
FIG. 1 illustrates a simple topology for a networked CNC system, according to a preferred embodiment of the present invention.

Referring generally to FIG. 1, a system 10 is illustrated according to a preferred embodiment of the present invention. In this illustration, system 10 has a simple topology in which one or more workstations 12 and one or more CNCs 14 are linked to a network 16 that allows the workstation 12 to communicate with the CNC 14. System 10 utilizes a workstation man-machine interface having a standard process-to-process communication protocol in a commonly used operating system and translates the process-to-process communication protocol to a CNC compatible protocol, or vice versa, to allow communications between the networked CNC and the man-machine interface.

In the preferred embodiment, workstation 12 comprises a personal computer 18 that has a central processing unit (CPU) 20. An exemplary personal computer 18 is configured with a Pentium™ processor rated at 75 MHz or higher. The exemplary PC 18 also has twenty (20) megabytes or more of RAM and includes a VGA or SVGA monitor 22, a mouse 24 and a keyboard 26 for entering data. Furthermore, workstation 12 includes a file handler 28 and a storage medium 30, such as a hard disk, for storing files for use by CNC 14. By way of example, the files may be part programs, macros, subroutines, etc. that are used by CNC 14 in controlling machine motion.

Workstation 12 also comprises a common operating system, such as a Windows-based operating system or a UNIX operating system. Preferably, however, workstation 12 comprises a Windows-based operating system and includes a Windows-based software package, such as WindowsNT. Other Windows packages, such as Windows95, also could be used in system 10.

Workstation 12 implements a standard protocol that allows process-to-process communications. In the preferred embodiment, the protocol utilizes Dynamic Data Exchange (DDE) to allow one DDE-compliant Windows application to communicate with another DDE-compliant Windows application linked to network 16. However, system 10 may be adapted to use other application programming interfaces, such as "C" application programming interface (CAPI) or Object Linking and Embedding (OLE) automation, that also can be adapted to accomplish desired process-to-process communication. Because of their commonly used protocols, CNCs traditionally have not been amenable for communication with such application programming interfaces that utilize, for example, Windows-based applications. Thus, the adaptability and flexibility of Windows-based operating systems have not been sufficiently available in CNC environments. Additionally, this has limited the ability for networking CNCs with other devices or other applications over commonly used networks.

Network 16 may comprise a variety of network types, e.g., WANs or LANs, but in most applications it is a local area network (LAN). For example, network 16 preferably is an Ethernet TCP/IP network that is readily useable for the linking of multiple personal computers, CNCs and other devices and applications.

CNC 14 includes one or more processors 32 that cooperate with a CNC executive 34 to receive data from workstation 12 and to communicate data back to workstation 12. The CNC executive 34, along with processor 32, also executes commands, e.g. part program commands, and monitors the motion and other parameters of a machine under its control. Additionally,. CNC 14 includes an available memory 36 into which part programs and other data may be loaded by, for example, the use of file handler 28.

An exemplary CNC 14 is a 9/Series CNC using a 9/260 or 9/290 processor available from Allen-Bradley Company, Inc., located at 1201 South $2^{nd}$ Street, Milwaukee, Wis. However, CNC 14 potentially can be selected from a variety of types or brands of computer numerical controls adapted for linking to network 16. With other types or brands of CNC, the protocol. conversion must be adapted to accommodate the specific protocol used for that CNC.

Depending on the specific type of network 16 used with system 10, an appropriate communication module 38 is used to link personal computer 18 to network 16. Similarly, an appropriate CNC communication module 40 is connected to CNC 14 to permit CNC 14 to be linked to network 16. Communication module 38 and CNC communication module 40 allow for the sending and receiving of desired packets of data over network 16. For example, file handler 28 may be used to transfer a part program file from storage medium 30 to CNC memory 36. The actual file is transferred in the form of bundled packets over standard, open network 16. A preferred embodiment of system 10 is described in detail below.

In a typical environment requiring motion control, CNC 14 is connected to a machine 42, such as a machine tool. Machine tools are used to perform a variety of operations, including milling, drilling, boring and grinding. However, CNC 14 can be used to control other types of machines and processes, including coordinate measuring and part manipulation. In any of these environments, machine 42 includes one or more movable components 43. The motion of movable components 43 is controlled by CNC 14 to manipulate a tool, component or workpiece according to programmed instructions obtained from a part program file. In a machine tool environment, movable components 43 are controlled to move a tool 44 with respect to a workpiece 46. In any of these situations, however, CNC 14 can be adapted to provide the necessary control of machine motion to carry out the desired process, as is understood by those of ordinary skill in the art.

The inventive system 10 provides an operator with the convenience, flexibility, adaptability and wide variety of uses for a Windows-based operating system in reading and writing data as well as providing commands between multiple workstations 12 and multiple CNCs 14. It further allows the operator to manage files containing part programs or part program related functions that may be accessed via network 16. For instance, through a given networked workstation 12, the operator is able to take advantage of file handler 28 (which can be located at the workstation 12 or at another workstation or other location accessible via network 16) for activating and executing part programs on files stored on storage medium 30 or on other storage mediums accessible via network 16. The operator also can transfer files between CNC 14 and storage medium 30.

Figure 2:
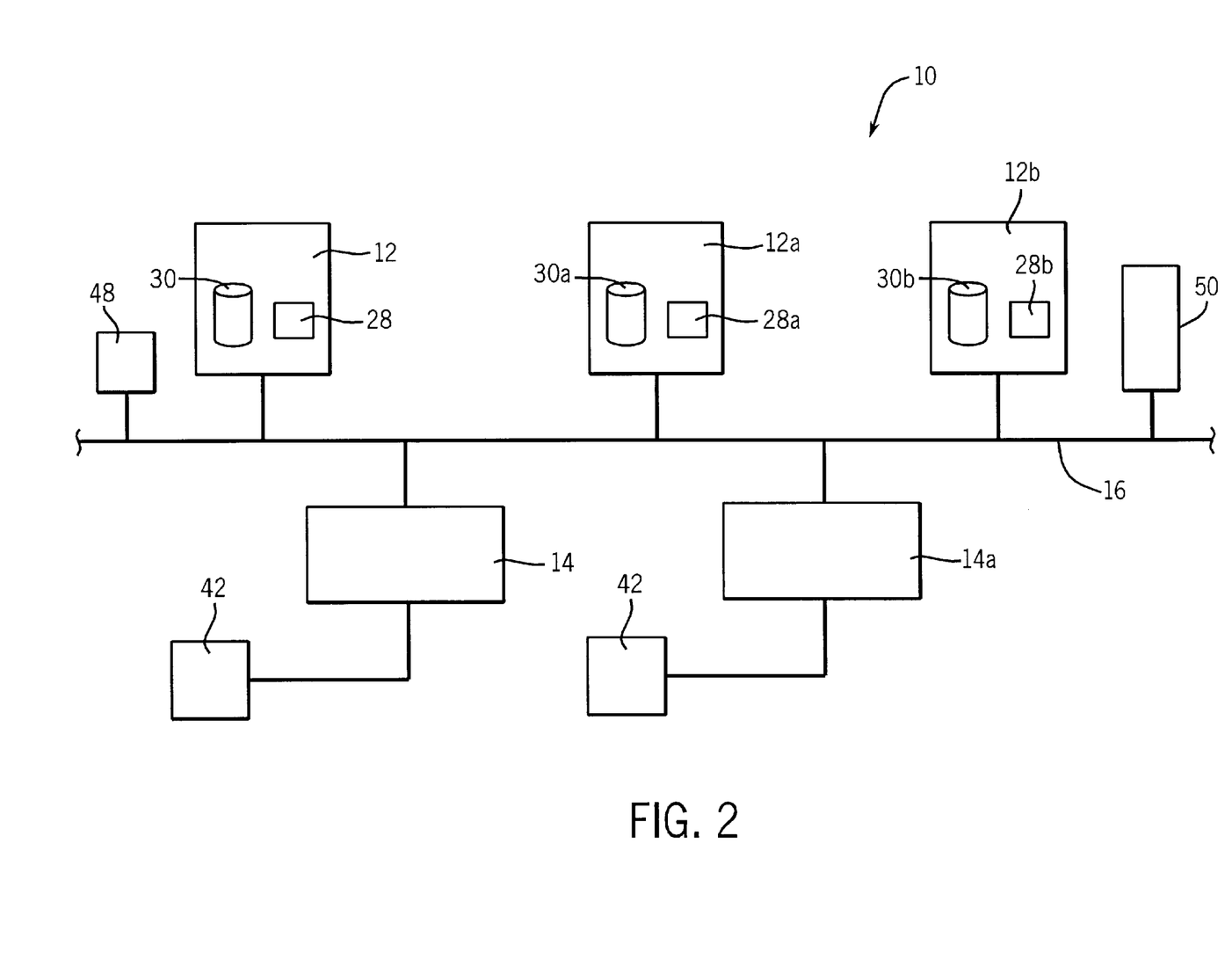
FIG. 2 illustrates an expanded, open M-to-N topology for a networked system of workstations, storage devices, file handlers and CNCs, according to a preferred embodiment of the present invention.

Referring now to FIG. 2, a more general topology for system 10 is illustrated. In this embodiment, M workstations 12, 12a and 12b are networked with N CNCs 14 and 14a over open network 16. There are many other potential topologies other than that of FIG. 2, but the illustrated embodiment is adequate for the purpose of describing the present invention.

Preferably, each workstation 12, 12a and 12b includes a corresponding file handler 28, 28a and 28b, respectively. Similarly, each workstation 12, 12a and 12b includes a storage medium 30, 30a and 30b, respectively. It should be noted, however, that system 10 allows for many other arrangements of file handlers and storage mediums. For example, each workstation 12, 12a and 12b may utilize a single file handler 28 located at one of the workstations or at another location accessible via network 16. Also, each of the workstations 12, 12a and 12b may utilize a single storage medium 30, such as a hard disk, disposed at one of the workstations or at another location accessible via network 16. The file handler 28 and storage medium 30 also can be located at separate locations or separate workstations linked to network 16.

Thus, system 10 potentially allows files with motion control programs or related data to be stored on a single storage medium 30 linked to network 16. Management of those files may be handled by file handler 28 disposed at the same networked location as storage medium 30 or at another location accessible via network 16. Control of the file handler 28, however, can be directed by an operator working at any of. the workstations 12, 12a or 12b. The individual file handler 28 can be used to upload or download files to/from storage medium 30 for any of the networked CNCs 14 and 14a. Additionally, file handler 28 can be used to activate and execute part programs or other part program functions on the files stored at storage medium 30 for use by a designated CNC. The designated CNC uses part programs or part program functions in controlling the movable components 43 of one of the machines 42. Typically, each CNC 14, 14a is designated to a specific machine 42.

It should be apparent that system 10 provides great openness and adaptability in the management of files containing part programs or part program related information on a system of networked workstations and CNCs. An operator at a given workstation 12 can access files and utilize files stored at-his workstation, at a designated CNC, at other workstations, or at other locations accessible via network 16. This structural openness introduces a new era of flexibility in machine control for CNC environments.

The use of a common, open network 16 allows the linking of additional devices 48, 50 to network 16. Exemplary devices 48 and 50 include other PCs, printers, sensor devices, instruments, etc. that potentially can communicate with one or more of the workstations 12. In this type of open network system, the packets of data sent over network 16 must be appropriately addressed to the desired workstation 12, CNC 14 or other device 48, 50.

For example, in the preferred embodiment, each workstation 12 comprises personal computer 18 having a Windows-based operating system that utilizes DDE to accomplish process-to-process communications. Additionally, each workstation 12 includes a data server, described more fully below, that converts data from a DDE format to a CNC compatible format and vice versa. With respect to a given file handler, e.g., file handler 28, the data server sends appropriate instructions regarding part program operation to the designated CNC 14 which then requests the appropriate action by the designated file handler 28.

With DDE, three pieces of information are supplied to the data server to ensure proper communication to the desired CNC 14 or other device. The three pieces of information are the Service or Application name, the Topic name and the Item name. In this embodiment, the Service or Application name is the data server at the man-machine interface being utilized; the Topic name, for example, is the Ethernet alias for the desired CNC 14; and the Item name is a specific data item or command item. Data items typically are used to read and write data to/from the desired CNC 14 while command items typically are used to request the desired CNC 14 to perform a specific task, e.g., requesting a specific file from the file handler 28. This allows an operator to specify the desired request or other data in an application being used at a given workstation 12. The data is then directed to the data server and forwarded to the desired CNC 14. The data is appropriately tagged to allow the CNC to return the requested information, confirmation of instructions or other response to the appropriate workstation 12.

In the preferred embodiment, each CNC 14 has only one controlling workstation 12 at any given time. The first workstation to request control of a given CNC 14 is granted control, and other workstations 12 can not control the given CNC 14 until the controlling PC 18/workstation 12 relinquishes control. Similarly, only one file handler, e.g., file handler 28, is the controlling file handler for the given CNC 14 at any one time. Specifically, the controlling workstation and file handler are determined by a token grant mechanism on a first-come-first-served basis.

As is understood by those of ordinary skill in the art, a token is a small message indicating a free or busy condition. Each CNC 14 retains tokens that are provided to the first requesting workstation 12 and the first requesting file handler 28, and subsequently requesting workstations and/or file handlers are rejected based on the busy condition. Only after the first workstation 12 relinquishes control is the token free for the next requesting workstation. Once in control, the controlling workstation 12 can freely send write requests or DDE commands, for example, to the controlled CNC 14. Similarly, only after the first requesting file handler relinquishes control is the file handler token free for the next requesting file handler.

The general M-to-N topology described provides great versatility in the transfer of data, including command instructions, to any of a variety of CNCs from one or more workstation locations, as well as the transfer and execution of files from remote, networked storage mediums. However, the preferred system has numerous other advantages due to the linking of the workstations 12 and CNCs 14 to a common network, such as an Ethernet network. By providing a CNC protocol that adheres to, for example, TCP/IP protocol, system 10 allows workstations 12 and CNCs 14 to communicate over a common network that is also available for data transfer between a variety of other devices. Additionally, each workstation 12 preferably utilizes standard process-to-process communication protocols, such as DDE, used in conjunction with a common operating system, such as a Windows-based operating system. This helps programmers prepare application programs for use by CNCs 14, because they can utilize, for instance, WindowsNT application programming and Windows-based interprocess communication methods rather than being limited by conventional proprietary CNC systems.

A specific, preferred embodiment of one type of open control architecture and CNC amenable for use in such an open, networked file management system is described with reference to FIGS. 3 through 5. The described embodiment, however, should not be construed as limiting the general nature of this invention describing a flexible system for networking CNCs, workstations, file handlers and storage mediums. For example, other types of CNCs and PC based workstations may be adapted for use in such networked CNC environments.

Figure 3:
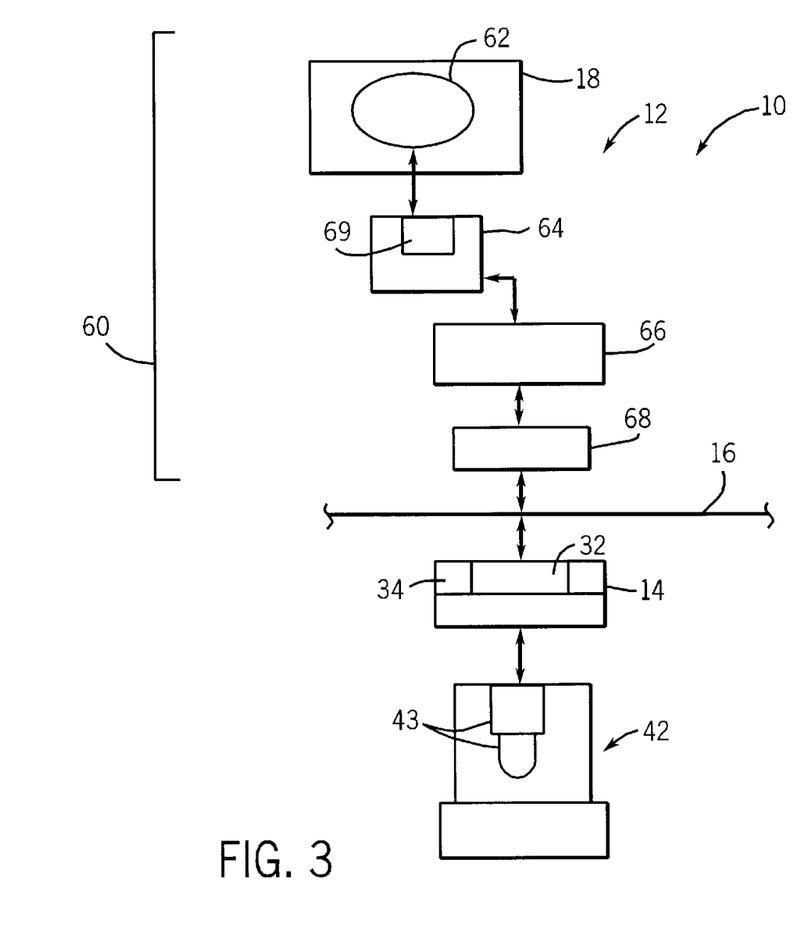
FIG. 3 illustrates a portion of a preferred open control interface adapted to communicate with a CNC over a network such as that illustrated in FIG. 2.
Figure 4:
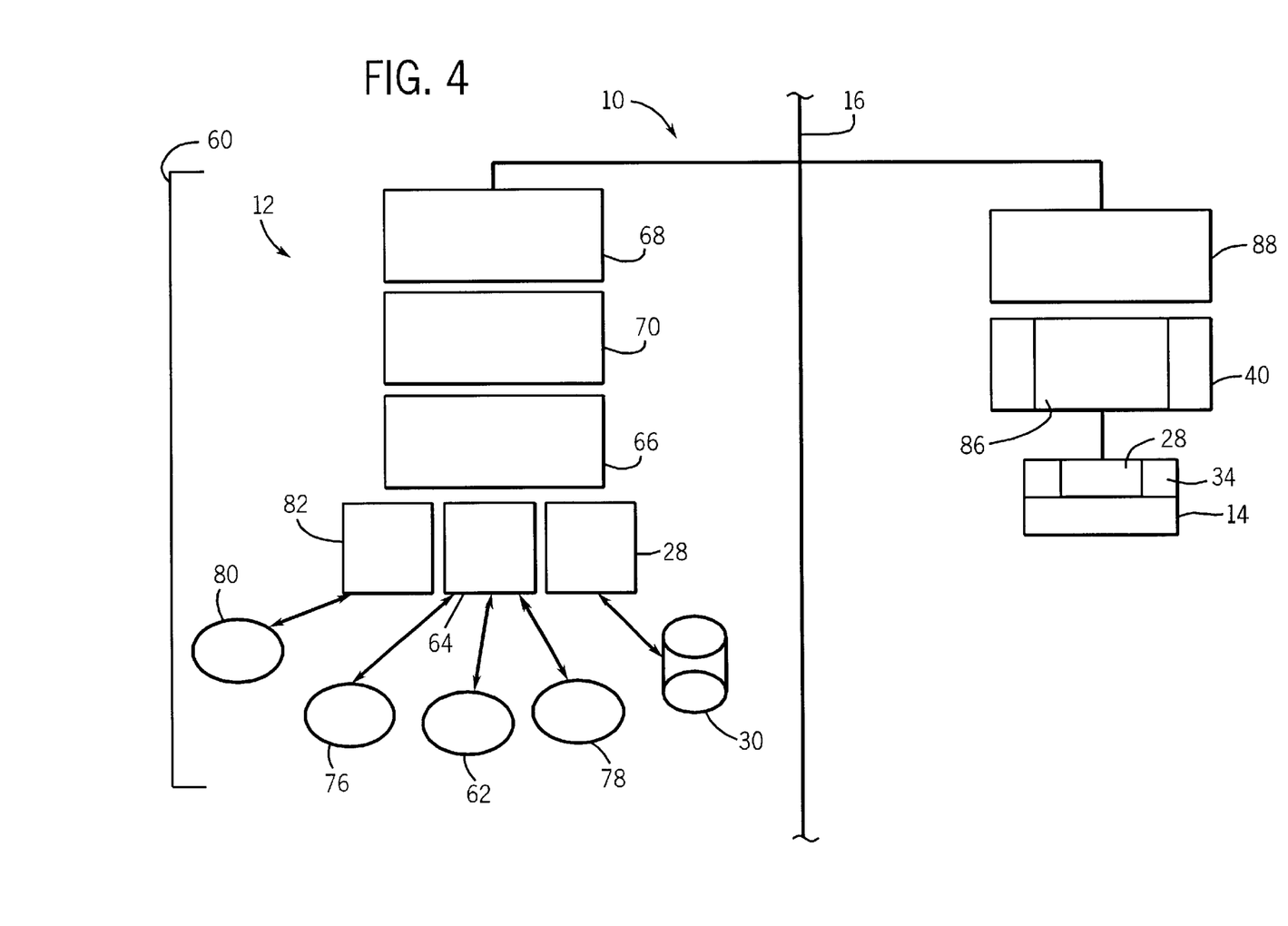
FIG. 4 illustrates one preferred open control interface architecture used with a workstation/file handler/CNC system, such as that illustrated in FIG. 2.
Figure 5:
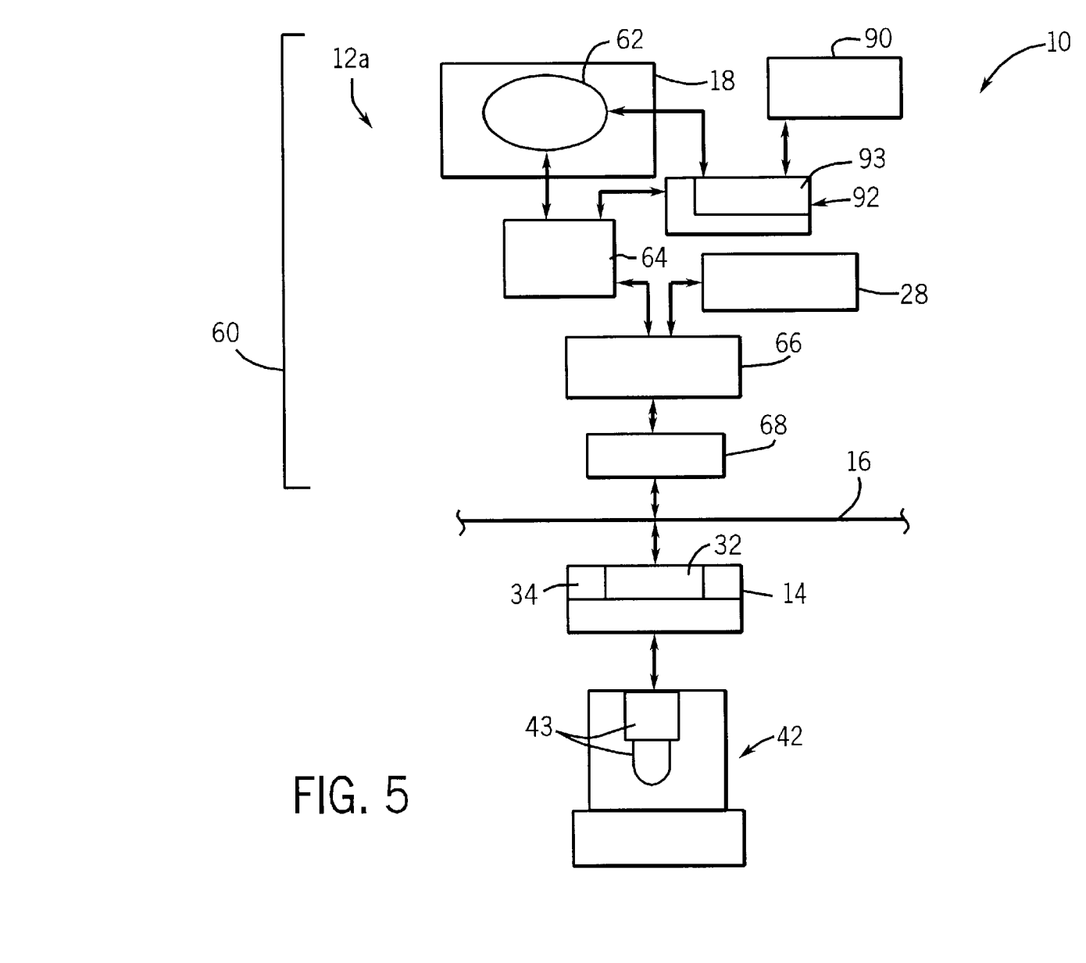
FIG. 5 illustrates additional software modules that can be used with the open control interface illustrated in FIG. 4

Referring generally to FIGS. 3–5, a preferred embodiment of system 10 is further described with reference to workstation 12 linked over network 16 to CNC 14. For the purpose of describing the preferred system, workstation 12 and CNC 14 are referenced, but the description applies equally to the other workstations and CNCs.

In this preferred embodiment, it should be assumed that the Windows-based operating system is WindowsNT version 4.0 or higher, and the process-to-process communication protocol is Dynamic Data Exchange. Thus, each workstation 12 is configured for DDE-compliant Windows applications. However, the present invention should not be construed as limited to this configuration and is adaptable to other versions of Windows, other compatible process-to-process communication protocols and other network types.

The general implementation of a preferred embodiment of CNC 14 linked to workstation 12 is illustrated in FIG. 3. System 10, and specifically workstation 12, uses an open control interface architecture 60 that utilizes a Windows-based operating system. Open control interface 60 is sometimes referred to as an intelligent front panel as opposed to a standard, dedicated front panel used on a conventional CNC. Open control interface 60 typically includes a personal computer, such as the conventional PC 18 described above. In the preferred embodiment, open control interface 60 combines a WindowsNT operating system with Dynamic Data Exchange so that a variety of DDE-compliant Windows-based applications, e.g., a DDE-compliant Windows application 62, may be used on system 10.

The DDE-compliant application 62 communicates with a conversion module 64 which converts DDE protocol communications/data from the DDE-compliant Windows application 62 to a CNC-compatible protocol. Additionally, conversion module 64 converts data received from CNC 14 into DDE-compliant data that is passed back to DDE-compliant application 62.

Conversion module 64 cooperates with a communication management module 66, preferably a client server, which effectively manages data flow between conversion module 64 and an appropriate network interface 38, e.g. communication module 38 described with references to FIG. 1, so that the data supplied from conversion module 64 is encoded for transmission across network 16. For example, the client server 66 may encapsulate validated DDE requests provided to conversion module 64; place them into the appropriate parameterized CNC command protocol; and send them to the appropriate CNC 14 over network 16. In this embodiment, network 16 is an Ethernet network and network interface 68 comprises a TCP/IP compatible Ethernet card, such as the Etherlink III™ distributed by 3Com Corporation.

Communication management module 66 handles both data from conversion module 64 that is sent to CNC 14 and also data communicated from CNC 14 to conversion module 64.

In the preferred embodiment, conversion module 64 is a data server. An exemplary data server for use with a CNC, such as the Allen-Bradley 9/Series CNC, is the 9/Series OCI Data Server, catalog number 8520-IFP1, that utilizes a software module 69 referred to as RS Server Toolkit™, catalog number 9355WABOEMM, to facilitate translation to the appropriate DDE or CNC protocol used in this exemplary system. The 9/Series OCI Data Server is available from the Allen-Bradley Company, and the RS Server Toolkit is available from Rockwell Software, Inc., a subsidiary of Allen-Bradley Company, Inc. and located at 6680 Beta Drive, Cleveland, Ohio 44143. Additionally, a preferred communication management module 66 also is available from Rockwell Software and is referred to as RSLinx™, catalog number 9355WABOEMM.

The combination of conversion module 64, communication management module 66 and network interface 38 provides for the reading and writing of data as well as the communication of commands, entered via DDE-compliant application 62, with a CNC.14, such as the 9/Series CNC. The communications (e.g., data organized in packets appropriate for a given network) are transmitted over network 16. Thus, the motion of the movable components 43 of machine 42 may be affected and monitored via the standard PC 18 utilizing a Windows-based operating system. Also, instructions related to file transfer or part program execution can be sent to CNC 14 and forwarded to the controlling file handler 28. This provides great flexibility in the use of PC 18, not only with the preferred CNC 14, but with other Windows-compliant devices and other Windows-based applications linked to network 16.

Another advantage of system 10 is its unique ability to preserve both CPU and network bandwidth by limiting the flow of data over network 16 between any of the selected CNCs 14 and the selected workstations 12. In other networked systems, network devices are continuously polled for data over the network by a workstation, e.g., a PC. However, with system 10, the polling of data preferably is performed internally to each CNC 14 by its own processor 32, and data is transmitted over network 16 to the selected workstation 12 only when necessary or at predetermined, limited times. This preserves not only network bandwidth but also the personal computer's CPU 20 bandwidth by releasing the CPU from handling the polling tasks and allowing workstation 12/PC 18 to communicate with other networked devices or run other applications. Without the ability to push polling responsibility to the CNC 14, certain machining environments or CNC applications might require a dedicated PC.

In some situations, CPU bandwidth is further preserved by pushing other data handling tasks to the CNC (e.g. loading part programs directly into the CNC); by utilizing the greater efficiency of AdvanceDDE protocol; and by bundling related and/or unrelated pieces of data that are sent over network 16 to a desired CNC 14 as "bundled packets". The use of bundled packets reduces the time otherwise spent by CPU 20 in managing the transfer of numerous smaller pieces of data.

A more detailed schematic of the software architecture of open control interface 60 is illustrated in FIG. 4. As described previously, a DDE-compliant Windows application 62 communicates with a conversion module/data server 64 which, in turn, communicates with communication management module 66. The data server converts communications following DDE protocol into an appropriate protocol that is recognizable and useable by CNC 14. In the preferred embodiment, communication management module 66 utilizes a communication tool 70, such as the WinSock™ communication tool software available from Microsoft Corporation. These tools provide for the interchange of data, including commands, with CNC 14 via network interface 68 which, in the preferred embodiment, is a TCP/IP Ethernet card having a WinSock-compliant driver (e.g., 3Com Corporation's Ethernet III card).

In addition to the basic software components outlined above, the open control interface 60 includes file handler 28. File handler 28 cooperates with communication management module 66 and one or more designated, storage mediums 30, such as a hard disk of personal computer 18. File handler 28 typically is a software module that provides an interface between the hard drive of PC 18 and the CNC 14. However, file handler 28 also can transfer files between CNC 14 and other remote storage mediums, such as storage mediums 30, 30a and 30b, or file handler 28 can be used to activate and execute part program functions on files stored and accessed through standard, open network 16.

This configuration allows an operator to use the hard drive of PC 18 or other storage mediums as a location for CNC motion control program storage as well as program execution. The file handler 28, in cooperation with communication tool 70 and network interface 38, provides for the intercommunication of data between CNC 14 and any of a variety of networked storage devices. The exact design or configuration of file handler 28 depends on the particular type of CNC and CNC protocol used in system 10. However, a preferred file handler 28, for use with the exemplary networked 9/Series CNC discussed above, is the 9/Series OCI CNC File Handler, catalog number 8520-IFP1, available from the Allen-Bradley Company. With this type of file handler, CNC 14 can copy and execute part programs that are located in the personal computer directory or at other networked locations. Often, the actual part program is loaded on the CNC to minimize the network traffic and to eliminate the time required for transferring part program data over the network during execution of the program. Loading the part program on the CNC is particularly helpful when the program includes very short data blocks used to control certain motions of machine 42.

Additionally, one file handler 28 may be used to provide files, e.g., part programs, to a plurality of CNCs. For example, a request for a certain file may be made at the DDE-compliant Windows application 62. This request is communicated to data server 64 and forwarded to the appropriately addressed CNC, which then requests the desired file from the designated file handler 28. Only one file handler 28 may be actively connected to the desired CNC at any given time, but the same networked file handler 28 can be used for multiple networked CNCs 14.

The architecture of open control interface 60 facilitates the use of additional CNC applications 76 as well as other third party applications 78 on personal computer 18. For example, a Windows-compliant spreadsheet application or a Windows-compliant graphics application can be loaded onto PC 18 and used to directly access CNC data on any selected CNC with no special modification of the system hardware or software. Thus, at each workstation 12, a wide variety of data from multiple CNCs 14 is available for use by the operator in monitoring data, graphing data, storing data or virtually any other function depending on the manufacturing or production environments, the available third party software packages and the goals of the end user.

The DDE-compliant conversion module/data server 64 allows such Windows-compliant third party applications and CNC applications to be used for the reading and writing of data to CNC 14 or other CNCs or devices linked to network 16, provided the data is appropriately addressed for transfer to and from those other devices, e.g., devices 48 and 50 or other workstations and CNCs.

Furthermore, open control interface 60 remains amenable for use with an offline development system 80, such as the Allen-Bradley Offline Development System (ODS), catalog number 8520-ODS, that allows a user to create, edit, document, and troubleshoot machine configuration, machine interfaces, and machine motion control files. The offline development system 80 also can be used with system 10 to upload and download part programs between any of the workstations 12 and CNCs 14 in a given topology. When offline development system 80 is connected over a network, such as network 16, it requires an appropriate driver 82, such as the RSI Virtual Device Driver™, catalog number 9355WABOEMM, available from Rockwell Software. Driver 82 cooperates with communication management module/client server 66 to implement communications with CNC 14.

On the CNC side, CNC 14 communicates with the communications module 4Q. Communications module 40 includes an appropriate client server 86 adapted to obtain the necessary protocol parts, such as instructions to read data, write data or execute commands, from the data packets that are received over network 16 from DDE-compliant application 62 and data server 64. The client server 86 presents these instructions/requests to CNC 14 where they are appropriately processed by CNC processor 32 and executive 34. Communications module 40 cooperates with a driver 88, such as an Ethernet TCP/IP driver, to send and receive data and commands over Ethernet network 16.

The design of CNC communications module 40 and client server 86 depends on the preferred CNCs and protocols implemented in system 10. However, in the exemplary preferred embodiment, an Ethernet module, such as the 9/Series OCI Ethernet module, catalog number 8520-ETCP, available from the Allen-Bradley Company, may be used as an interface between the CNC and an Ethernet TCP/IP compatible network. This type of Ethernet module provides for commands and data transfers to/from systems running a suitable conversion module/data server 64. The Ethernet module also passes through instructions from conversion module/data server 64 to the CNC regarding the transfer of CNC part programs from file handler 28 (the CNC then sends the appropriate request to file handler 28 for the desired part program); facilitates transmission of commands and file transfers from off-line development system 80; and allows updates to be made to the CNC executive.

As illustrated in FIG. 5, certain other features may be combined with system 10 to enhance performance, adaptability and ease-of-use for the operator. For example, a customized display set 90 may be helpful in allowing a user to prepare an operator interface having desired screens displayed on the monitor 22 of PC 18. The screens can be customized, for instance, to emulate screens with which the operator is familiar. For example, the 9/Series Basic Display Set, available from the Allen-Bradley Company, is a DDE-compliant application that provides the user interface between PC 18 of workstation 12 and CNC 14, e.g., a 9/Series CNC. This software emulates the 9/Series CNC screens and allows the user to control, program, position and monitor the CNC via an interface that is recognized and comfortable for the operator to use.

Additionally, a performance enhancement software module 92 may be used to provide enhanced performance for systems implementing Rockwell Software's AdvanceDDE protocol. For example, Rockwell Software supplies a software module referred to as RSData™, catalog number 9361DATAOCXOEM, that can be used with suitable DDE-compliant applications 62 and conversion module/data server 64 to provide enhanced performance in a system that conforms to the AdvanceDDE protocol. RSData takes advantage of a high speed DDE communications module 93, such as Rockwell Software's RSJunctionBox™, catalog number 9361JBOXOEM, that facilitates considerably higher performance between appropriate DDE-compliant applications and data servers. The foregoing provides examples of potential modifications to system 10.

Figure 6:
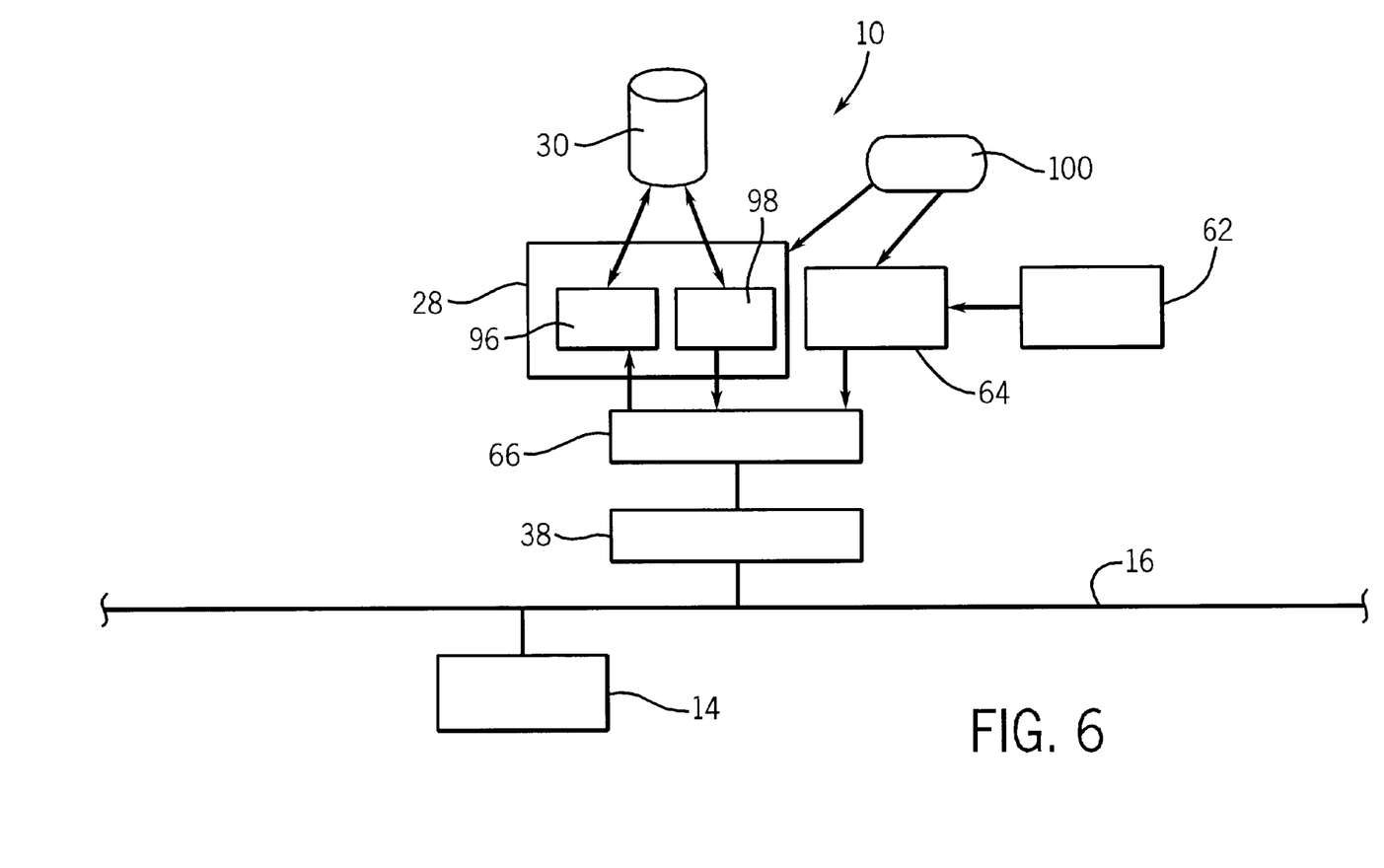
FIG. 6 illustrates the general architecture of the preferred file handler used in the open control interface illustrated in FIG. 4.

Referring generally to FIG. 6, the architecture of file handler 28 and its relationship to other components of system 10 will be described. In the preferred embodiment, all operations conducted by file handler 28 are initiated through data server 64 which receives the operator's instructions regarding file operations via the DDE-compliant Windows application 62. It is preferred that all file management interactions involve a command-response paradigm and that the agent, e.g., the CNC 14 or the file handler 28, receiving the file controls the flow of data. For instance, during file transfer operations from a desired storage medium 30, such as a hard disk on PC 18, the CNC controls the operation and flow of data by cooperating with a file server 96 of file handler 28. When data,-such as a part program, is transferred from the CNC 14 to a desired storage medium 30, the process is initiated through the DDE-compliant Windows application 62 and data server 64 which sends the commands to CNC 14. CNC 14 then forwards the file movement request to file handler 28. A file client 98 of file handler 28 actually processes the request and conducts-the file transfer from the CNC to storage medium 30.

For the most part, file management operations are either file movement operations or file execution operations. File movement operations involve the movement of files, e.g., part program files, from the designated CNC 14 to the desired storage medium 30 (typically at one of the workstations 12) or from the designated storage medium to the desired CNC. However, file execution operations always move data from the designated storage medium 30 to the desired CNC 14, and therefore the operation and flow of data is controlled by the CNC in cooperation with file server 96. With any of these file management operations, the packets of data are passed from storage medium 30 to CNC 14 or vice versa with the assistance of communication management module 66 to which file handler 28 is linked, and the appropriate communication modules, such as communication module 38 and CNC communication module 40.

Typically, each of the workstations 12 includes a configuration file 100 that is used to configure file handler transactions according to the commands input at DDE-compliant Windows application 62 and initiated by data server 64. Configuration file 100 establishes system parameters such as whether file handler 28 needs to connect to a CNC 14; the network node address of the desired CNC 14 to which the file handler is to communicate; and the appropriate storage medium 30 to be utilized by the designated CNC 14. The directory specification, i.e., storage medium designation, in the PC configuration file 100 can contain physical or logical drive specifications. This allows for broad access to multiple file locations linked to network 16. Virtually any network resident file for which the Windows-based file system will support accessing can be utilized by CNC 14 in the transfer or execution of programs related to machine motion control.

The broad access to multiple file locations provides system 10 with great versatility in utilizing files related to controlling machine motion, including part programs, macro calls, subroutines, etc. Potentially, each type of file can be located at a CNC main directory, a CNC protected directory or the hard disk of a designated PC 18. For example, a part program can be stored in the main directory or the protected directory of CNC memory 36, e.g., a RAM disk; a macro can be stored in storage medium 30, e.g., the hard drive of PC 18; and a subroutine also can be stored at storage medium 30. Configuration file 100 establishes the appropriate system parameters such that. file handler 28 can transfer or execute the appropriate part programs, macro calls and/or subroutines from their networked locations.

By way of specific example, in the preferred Windows-based system implementing DDE communication protocol, file handler operations are entered through DDE-compliant application 62 and initiated by data server 64. A specific file operation, such as a copy command (PP_COPY) includes one or more file name specifiers as a string parameter to the command. The file naming convention indicates where the file resides. For example, the following are mandatory drive specifiers used in file names for a range of file targets:
"MAIND:" CNC main directory
"PROTD:" CNC protected directory
"HARDD:" designated file handler hard-disk directory
However, the directory, e.g., storage medium, specification in the configuration file can contain physical or logical drive specifications. For example, the directory specification can be set up to use a directory "d:\abcnc\ifp_cnc4" as the default directory. In a copy operation, the file specification in the PP_COPY command may be "HARDD:\oper123\part_45.ppg". The file handler then receives file operations directed to the hard disk file "\oper123\part_45.ppg" which is concatenated to the default directory specification "d:\abcnc\ifp_cnc4" to access the file "d:\abcnc\ifp_cnc4\oper123\part\_45.ppg" in the appropriate Windows commands, such as file open, file read, file close, etc. The default directory and the file name specifiers can be combined to access any PC resident or network resident file which the Windows file system will support accessing.

As mentioned previously, each CNC 14 cooperates with a designated file handler 28 at any given time. Effectively, each valid file handler is registered with its corresponding CNC during start-up. If appropriately configured in its start-up file, each file handler during start-up requests the designated CNC 14 to grant it file handler control for part program transfer operations and part program execution operations. If the CNC has not currently granted file handler control to another file handler, it grants the request to the first file handler 28 requesting control. This design permits the data server 64 and the file handler 28 to be located at separate workstations 12, and enables utilization of data servers 64, file handlers 28, and storage mediums 30 at separate networked locations.

Figure 7:
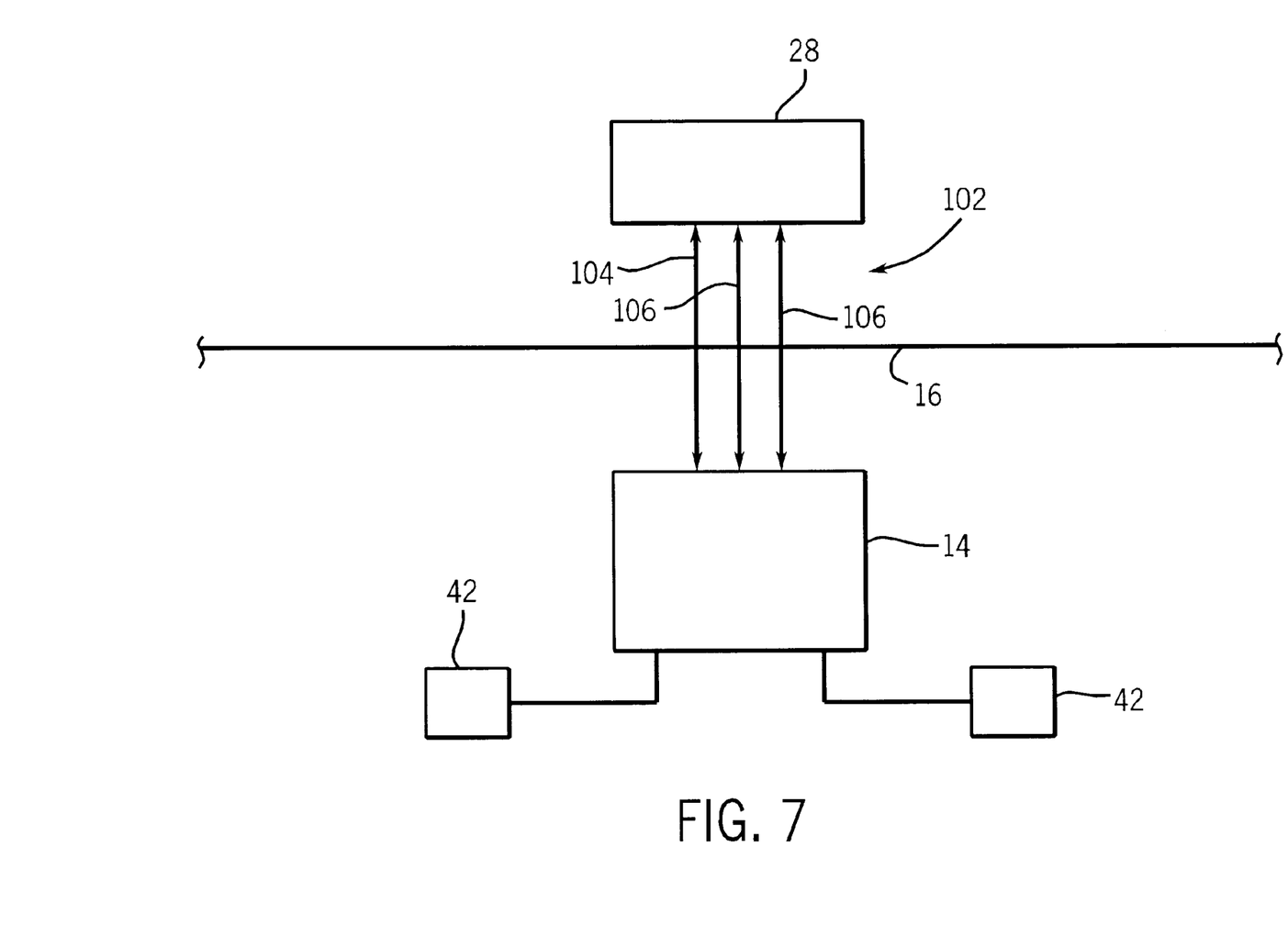
FIG. 7 schematically illustrates a multiple channel connection between the file handler and a computer numerical control, according to a preferred embodiment of the present invention.

As illustrated schematically in FIG. 7, each file handler 28 preferably establishes a plurality of communication channels 102 with each of the CNCs 14 for which it is the controlling file handler. Preferably, at least two communication channels are established, including a file transfer channel 104 and a part program execution channel 106. However, there may be additional communication channels 102 established. For example, in a multi-process CNC system, each CNC program execution process has its own file execution channel 106 to allow simultaneous execution of part programs, macros or subroutines from a given storage medium 30, e.g. a hard disk of PC 18. File handler 28 opens a communication channel 106 for each CNC program execution process after determining the number of such part program execution processes on CNC 14. The multiple file execution channels 106 allow a single CNC 14 to be used in executing multiple part program related files directing the motion of multiple machines 42 (see FIG. 7) and/or the motion of multiple tool tips on a given machine 42. During this multi-process execution of motion control programs, files also can be transferred over file transfer channel 104.

When the file handler 28 is initialized during start-up, the specific CNCs 14 which the file handler 28 will serve are specified in the file handler configuration file 100 along with the node addresses of the CNCs and the communication channels to be used for transfer of data between the CNC 14 and file handler 28. Assuming the designated CNCs 14 do not already have a controlling file handler, file handler 28 is granted control and provides each CNC 14 under its control with a list of communication channel IDs. CNC 14 uses these channel IDs to communicate appropriate requests through the proper channel. The use of multiple communication channels 102 allows file transfer related commands to be issued while the CNC 14 is executing part programs from storage medium 30. Additionally, in multi-process CNC systems, a part program execution channel 106 may be opened for each CNC program execution process. This design approach provides system 10 with both the capability of activating and simultaneously executing multiple part programs or part program related files from a remote storage medium 30, and executing one or more part program or part program related files while other file transfer operations are in progress.

It will be understood that the foregoing description is of a preferred exemplary embodiment of this invention and that the invention is not limited to the specific forms shown. For example, numerous workstation, file handler, storage medium and CNC network topologies can be constructed according to manufacturing needs. The specific workstations, CNCs and various software modules that permit Windows-based operating systems to be networked with CNCs is of a preferred, illustrative embodiment only. As is understood by those of ordinary skill in the art, the specific conversion techniques and software module configurations depend on the specific protocols used in a given system, e.g., the specific Windows-based process-to-process protocol as well as the protocol or protocols recognized and used by a given CNC. Also, there are a variety of ways to address and otherwise format the data packets communicated between a given Windows-based application, CNC, file handler and storage medium. The specific handling of data depends on the type of network used, the operating system version chosen, the need for linking with multiple types of operating systems, the brand or type of CNC and the other technologies incorporated into the system. However, these and other modifications may be made in the design and arrangement of the elements described above without departing from the scope of the invention as expressed in the appended claims.

What is claimed is:

1. A system for effecting file operations at a computer numerical control on files accessed at a remote location through a standard, open network, comprising:
   a network;
   a plurality of computer numerical controls linked to the network;
   a plurality of machines, with each machine being able to undergo predetermined motions, each machine being linked to at least one computer numerical control of the plurality of computer numerical controls, wherein the at least one computer numerical control is able to control the motions of the machine to which it is linked;

a plurality of workstations linked to the network, in which any but at least one workstation of the plurality of workstations includes a file handler; and at least one storage medium linked to the network, the at least one storage medium being configured to store a file having a machine control related program for the control of one or more of the plurality of machines, wherein the file handler is configured to selectively transfer the machine control program to the computer numerical control or to run the machine control program from its location on the at least one storage medium further wherein the file handler is connected to any of the plurality of computer numerical controls by a plurality of communication channels to permit simultaneous execution of one or more machine control programs while transferring another machine control program, wherein a part program, a part program subroutine and a macro can be executed at a given computer numerical control from either a memory of a computer numerical control or the at least one storage medium.

2. The system as recited in claim 1, wherein each workstation comprises a personal computer having a Windows-based operating system.

3. The system as recited in claim 2, wherein each workstation comprises an application program interface configured for use with the Windows-based operating system.

4. The system as recited in claim 3, wherein the application program interface comprises Dynamic Data Exchange (DDE).

5. The system as recited in claim 1, wherein each workstation includes a file handler.

6. The system as recited in claim 3, wherein each file handler is configured to support multiple computer numerical controls.

7. The system as recited in claim 4, wherein only one of the file handlers serves as a controlling file handler for a designated computer numerical control at any given time, further wherein the controlling file handler controls all file operations with respect to the designated computer numerical control until that control is relinquished by the file handler.

8. The system as recited in claim 5, wherein the at least one storage medium comprises a plurality of hard disk storage areas, further wherein each of the personal computers includes at least one of the hard disk storage areas.

9. The system as recited in claim 1, wherein each computer numerical control of the plurality of computer numerical controls includes a memory capable of storing a part program, and the at least one storage medium is capable of storing a part program subroutine, the file handler being configured to execute the part program subroutine from the at least one storage medium during execution of the part program.

10. The system as recited in claim 1, wherein the network comprises a local area network.

11. The system as recited in claim 1, wherein the network comprises an Ethernet network.

12. The system as recited in claim 1, wherein the plurality of machines comprises a plurality of machine tools.

13. A file management system for use with a plurality of networked workstations and computer numerical controls, comprising:

a file handler configured for communication with the plurality of networked workstations and computer numerical controls, the file handler including a file server and a file client, wherein the file handler is stored at a first networked computer;

at least one computer numerical control that is stored on a second networked computer remote from the first networked computer; and a storage medium able to store a part program, a part program subroutine and a macro for use by the at least one computer numerical control in controlling machine motion, wherein the file server is configured to selectively manage transfer of the part program, part program subroutine, or macro to the at least one computer numerical control from the storage medium or to manage execution of the part program, part program subroutine, or macro from the storage medium, and the file client is configured to manage transfer of data from the at least one computer numerical control to the storage medium.

14. The file management system as recited in claim 13, wherein the file handler and the storage medium are disposed at a single workstation that may be linked to the network.

15. The file management system as recited in claim 14, wherein the storage medium comprises a hard disk drive.

16. A system for utilizing multiple types of file operations on a networked computer numerical control from a remote networked storage medium, comprising:

a workstation;

a computer numerical control having a memory for storing a file having a machine control program, wherein a machine control program includes at least one of a part program, a part program subroutine, and a macro;

an open network to which the workstation and the computer numerical control are linked, the open network being capable of carrying communications between multiple types of devices;

a storage medium disposed at a remote location on the network relative to the computer numerical control, the storage medium being configured to store a file having a motion control program for use by the computer numerical control; and a file handler linked to the open network, wherein instructions related to movement of the file between the computer numerical control and the storage medium is input at the workstation and transferred to the file handler for implementation further wherein the file handler is connected to any of a plurality of networked computer numerical controls by a plurality of communication channels to permit simultaneous execution of one or more machine control programs while transferring another machine control program, further wherein the part program, the part program subroutine or the macro can be executed at the computer numerical control from either the memory or the storage medium.

17. The system as recited in claim 16, wherein the file handler is configured to manage execution of the motion control program over the open network at the computer numerical control when the motion control program is stored remotely in the storage medium.

18. The system as recited in claim 17, wherein the workstation comprises a personal computer having a Windows-based operating system that implements Dynamic Data Exchange (DDE) as its communication protocol for a DDE-compliant Windows application, and a data server that provides a DDE interface between the computer numerical control and the DDE-compliant Windows application, further wherein instructions related to file operations may be entered via the DDE-compliant Windows application, transferred over the open network to the computer numerical control by the data server and then sent to the file handler for implementation.

19. The system as recited in claim 18, wherein the computer numerical control includes a memory capable of storing a part program, and the storage medium is capable of storing a part program subroutine, the file handler being configured to execute the part program subroutine from the storage medium during execution of the part program.

20. The system as recited in claim 18, wherein the file handler may be connected to the computer numerical control by a plurality of communication channels to permit simultaneous execution of one or more machine control programs from the storage medium.

21. The system as recited in claim 16, wherein the file handler and the storage medium are disposed in the workstation.

22. The system as recited in claim 16, wherein the file handler is configured for use with a plurality of computer numerical controls.

23. The system as recited in claim 16, wherein the open network comprises an Ethernet network.

* * * * *